US008324575B2

(12) United States Patent
Garris et al.

(10) Patent No.: US 8,324,575 B2
(45) Date of Patent: Dec. 4, 2012

(54) LIQUID-TIGHT PROGRAMMING INTERFACE ASSEMBLY

(75) Inventors: William Eric Garris, Salem, VA (US); Raymond Jeng, Holyoke, MA (US)

(73) Assignee: Exelis, Inc., McLean, VA (US)

( * ) Notice: Subject to any disclaimer, the term of this patent is extended or adjusted under 35 U.S.C. 154(b) by 179 days.

(21) Appl. No.: 12/871,133

(22) Filed: Aug. 30, 2010

(65) Prior Publication Data

US 2012/0049065 A1 Mar. 1, 2012

(51) Int. Cl.
*H01J 31/49* (2006.01)
*G02F 1/00* (2006.01)
(52) U.S. Cl. ......................... 250/333; 250/330
(58) Field of Classification Search .......... 250/330, 250/338.1, 332, 333, 339.01, 339.02
See application file for complete search history.

(56) References Cited

U.S. PATENT DOCUMENTS

| 7,088,506 B2* | 8/2006 | Regan et al. ................ 359/425 |
| 2002/0003584 A1 | 1/2002 | Kossin |
| 2002/0030163 A1 | 3/2002 | Zhang |
| 2005/0151876 A1* | 7/2005 | Karr .............................. 348/373 |
| 2006/0216019 A1* | 9/2006 | Thompson ................... 396/427 |
| 2010/0192444 A1 | 8/2010 | Cabahug |

OTHER PUBLICATIONS

International Application Serial No. PCT/US2011/049667, International Search Report mailed Nov. 29, 2011, 5 pgs.

* cited by examiner

*Primary Examiner* — Mark R Gaworecki
(74) *Attorney, Agent, or Firm* — RatnerPrestia

(57) ABSTRACT

A liquid-tight sealed assembly comprises a housing for a night vision device and a transmissive window, wherein the transmissive window permits a signal to pass-through the transmissive window for programming or controlling the night vision device within the housing. A night vision imaging sensor assembly comprises an electronic module disposed within a housing of a night vision device, a control assembly disposed externally of the housing, and a control interface of the housing interposed between the electronic module and the control assembly. The control assembly and the electronic module are configured to transmit and receive signals. The control interface permits a signal to pass-through the housing while preventing environmental leakage into the housing. The transmissive window permits signals, such as infra-red, capacitive, or magnetic signals, to pass-through. The assembly minimizes environmental leakage paths into the housing, thereby preventing damage from environmental contaminants such as moisture.

20 Claims, 3 Drawing Sheets

LIQUID-TIGHT PROGRAMMING INTERFACE ASSEMBLY

FIELD OF THE INVENTION

The present invention relates, in general, to an assembly having a sealed programming interface. More specifically, the present invention relates to an assembly having a liquid-tight sealed interface which provides a transmissive window for programming and controlling enclosed electronics. The assembly provides contactless control of an electronic device, such as a night vision device, residing in a housing, without direct physical contact with the interior of the housing.

BACKGROUND OF THE INVENTION

Electronic devices are programmed and controlled by various methods. One commonly used method to program or control electronic devices involves the use of potentiometers, particularly adjustment potentiometers. Potentiometers are widely used as user controls, and may control a very wide variety of equipment functions. The widespread use of potentiometers in consumer electronics has declined in the 1990s, with digital controls now more common. However they remain in many applications, such as volume controls and as position sensors. Potentiometers are also used to program or set power supply set-points in various electronic devices, such as in night vision imaging devices.

The use of potentiometers or other such control assemblies requires a break-through of the equipment housing to enable the programming or controlling functionality. This breakthrough presents an ingress for environmental contamination of the internal electronics. For example, if the potentiometer is not properly sealed, moisture may enter the housing and damage internal electronics. This presents a critical risk for electronic devices that may be exposed to the weather and which need to ensure accurate functionality even in the face of difficult environmental conditions. Additionally, potentiometers have a mechanical interface which can be damaged during set-up or on-going operation. For example, the potentiometer may be rendered nonfunctional by breakage of the adjustment screw. Such damage could leave the electronic device inoperable in critical situations, when it is most needed to accurately function. Furthermore, the use of potentiometers to program and control electronic devices leaves the internal electronics subject to unintentional or unwanted readjustment or tampering. For particular electronic devices, such as night vision imaging devices, the potential for unwanted access to the potentiometer and for reconfiguration of settings to the internal electronics presents an unnecessary and intolerable security flaw. As such, particular electronic assemblies can not suitably employ potentiometers.

Remote, or contactless, mechanisms have presented a useful alternative to potentiometers for programming and controlling electronic devices. Remote systems may employ technologies such as infra-red to program and control electronics contained within a sealed housing, removing the need for physical contact between the control assembly and the internal electronics. Electronic devices which employ a remote system for programming and control may utilize a transmissive interface, such as a window or port, which enables such contactless control. While the remote mechanisms reduce or eliminate the potential for the electronic devices to be damaged or tampered, it remains important that the control interface be properly sealed to avoid ingress of environmental contaminants, such as moisture. A liquid-tight sealed assembly may be preferably utilized in electronic devices that are subject to, and are needed to perform without failure, under difficult environmental conditions. Environmental contamination, such as moisture, to the internal electronics of these devices, such as night vision imaging devices, can render the electronics inoperable when they are most needed.

Night vision imaging devices are used in a myriad of environmental conditions. Night vision goggles (NVG), utilize internal electronics such as image intensifiers to make objects visible in low-light situations. Image intensifier devices are employed in night visions systems to convert a dark environment to a bright environment that is perceivable by a viewer. Night vision systems have industrial, commercial and military applications. The image intensifier device collects tiny amounts of light in a dark environment, including the lower portion of the infrared light spectrum, that are present in the environment but imperceptible to the human eye. The device amplifies the light so that the human eye can perceive the image. The light output from the image intensifier device can either be supplied to a camera, external monitor or directly to the eyes of a viewer.

Image intensifier devices generally include three basic components mounted within an evacuated housing, namely, a photocathode (commonly called a cathode), a microchannel plate (MCP) and an anode. The photocathode is a photosensitive plate capable of releasing electrons when it is illuminated by light. The MCP is a thin glass plate having an array of channels extending between one side (input) and another side (output) of the glass plate. The MCP is positioned between the photocathode and the anode. The three basic components of the image intensifier device are positioned within an evacuated housing or vacuum envelope. The image intensifier device is generally capable of being programmed and controlled prior to and/or during operation. A system for programming and controlling the internal electronics of an electronic device remotely, without the need for a breakthrough of the housing, would eliminate the potential for damage by breakage of the controls, tampering of the programming, and/or environmental contamination to the electronics.

SUMMARY OF THE INVENTION

To meet this and other needs, and in view of its purposes, the present invention provides an assembly having a sealed programming interface. More specifically, the present invention relates to an assembly having a liquid-tight sealed interface which provides a transmissive window for programming and controlling enclosed electronics. The assembly provides contactless control of an electronic device residing in a housing, without direct physical contact with the interior of the housing.

In one embodiment, the present invention provides a liquid-tight sealed assembly for a night vision device which includes a housing for a night vision device and a transmissive window. The transmissive window permits a signal to pass-through the transmissive window in order to program or control the night vision device within the housing. The transmissive window may be over-molded to seal the housing and/or may be sealed to the housing by a sealant. The transmissive window permits signals to pass-through the housing, while preventing environmental leakage into the housing.

In a further embodiment of the present invention, the transmissive window is made of a polymer resin. The housing may also be made of a polymer resin. The materials for the transmissive window and the housing may be from the same resin family, such that they yield a tight molecular bond and provide a liquid-tight seal. Additionally, a sealant may be used to provide a liquid-tight seal between the transmissive window and the housing. An exemplary sealant is an epoxy. Furthermore, the electronic module disposed within the housing may be connected to transmissive window, at the side of the transmissive window facing internal to the housing. The transmissive window may be slotted to receive and retain the electronic module. Additionally, an adhesive may be applied to the transmissive window and/or the electronic module to retain the electronic module once it is connected to the transmissive window. The transmissive window permits signals to pass-through from the exterior to the interior of the housing, and vice versa, while preventing environmental leakage into the housing, to program or control the electronic module.

In yet another embodiment of the present invention, a night vision imaging sensor assembly includes an electronic module disposed within a housing of a night vision device, a control assembly disposed externally of the housing, and a control interface of the housing interposed between the module and the control assembly. The control interface includes a liquid-tight seal to isolate the interior of the housing from the control assembly. The control assembly external to the housing is configured to transmit signals, while the electronic module internal to the housing is configured to receive signals. In some embodiments, the electronic module may be configured to additionally transmit signals, such as set-points and system status, to be received by a control assembly configured to additionally receive signals. Accordingly, one-way or two-way communication is enabled in the night vision imaging sensor assembly according to these embodiments. The control interface permits a transmitted signal to pass-through the housing while preventing environmental leakage into the housing.

In a further embodiment, the control interface includes a transmissive window for permitting signals to pass there through. The transmissive window is sealed to the housing by over-molding and/or by a sealant. The control assembly and electronic module are configured to relay signals which are infra-red, capacitive, or magnetic signals. The transmissive window may be made of a polymer resin material. The housing may similarly be made of a polymer resin material. When the materials for the transmissive window and the housing are from the same resin family, they may yield a tight molecular bond to prevent environmental leakage into the housing.

It is understood that the foregoing general description and the following detailed description are exemplary, but are not restrictive, of the invention.

BRIEF DESCRIPTION OF THE DRAWINGS

The invention may be best understood from the following detailed description when read in connection with the accompanying drawings. Included in the drawings are the following figures.

DETAILED DESCRIPTION OF THE INVENTION

Figure 1A:
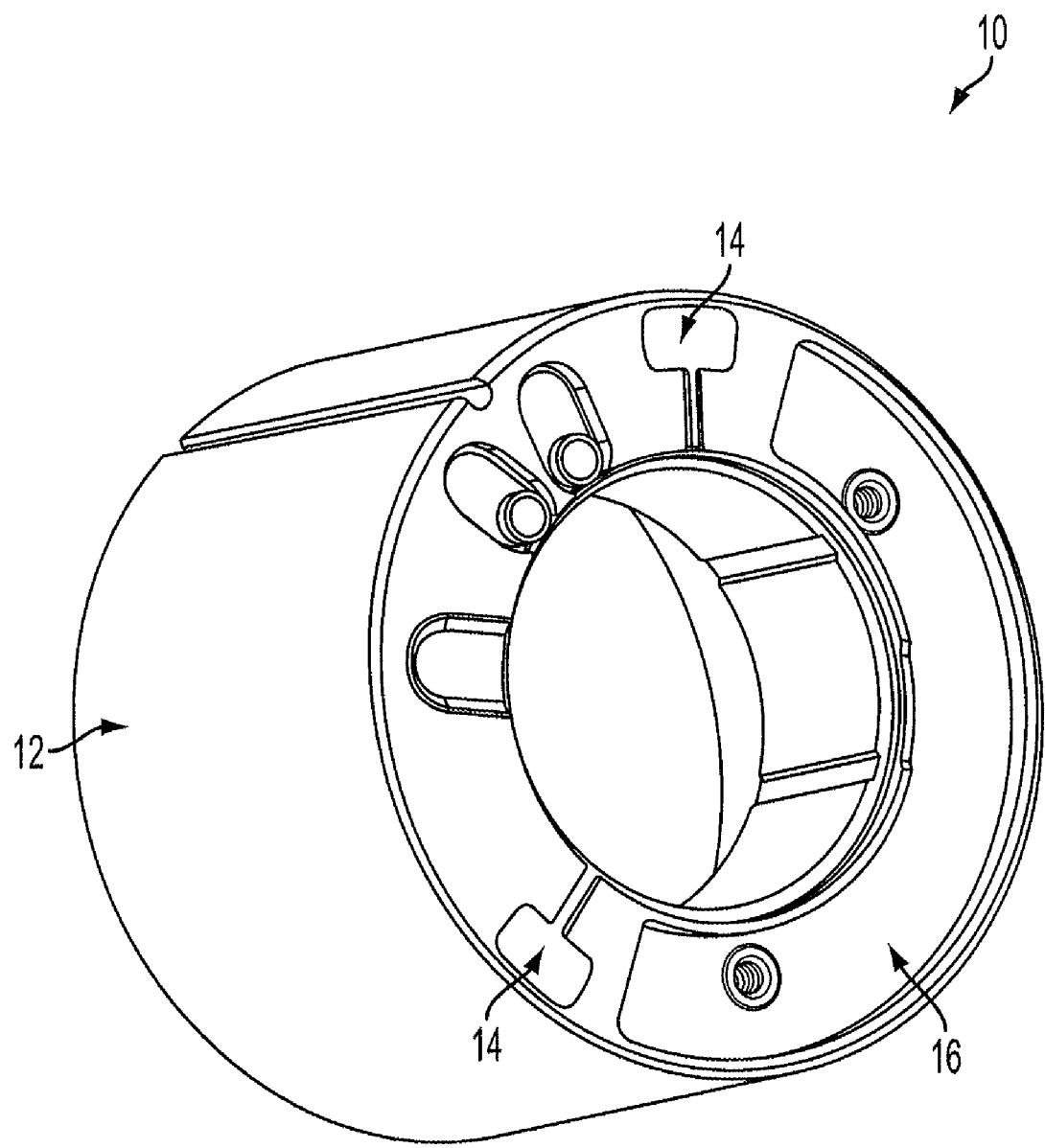
FIG. 1a is a perspective view of the liquid-tight programming/control interface assembly in accordance with an embodiment of the present invention.

The present invention provides an assembly having a sealed programming interface. More specifically, the present invention relates to an assembly having a liquid-tight sealed control interface which provides a transmissive window for programming and controlling electronics disposed within a housing. The assembly provides a means for contactless control of an electronic device residing in a housing, without direct physical contact with the interior of the housing. The liquid-tight sealed assembly of the present invention provides control and programmability to electronic devices, while preventing pathways for the ingress of environmental contaminants such as moisture. The liquid-tight sealed assembly of the present invention may be suitably employed in electronic devices that may be subjected to environmental conditions, such as night vision imaging devices.

The liquid-tight sealed interface assembly enables contactless or remote programming and control, eliminating the need for the control function to remain a part of the housing assembly and simplifying the assembly design. This can lead to more robust assembly designs. Additionally, separating the control assembly from the housing eliminates the possibility of mechanical breakage of the control assembly during set-up or during on-going operation. Similarly, because the electronic module is disposed entirely within the housing and controlled without direct contact, unwanted tampering or inadvertent adjustment to the internal electronics, such as the power supply settings, may be minimized.

An embodiment of the present invention includes an over-molded window at the control interface on the housing for a night vision device. The over-molded window enables contactless programming and control of the electronics internal to the housing, while also providing a liquid-tight seal. The materials for the window and housing may be from the same resin family and yield a tight molecular bond. This tight molecular bond prevents possible ingress of environmental contaminants, such as moisture. The over-molded window is transmissive such that it allows programming and control signals to pass-through the interface to an electronic module within the housing. The transmissive quality of the over-molded window can be achieved by various methods, such as by translucent or opaque characteristics imparted by the transmissive window material. Programming or control signals, such as the signals created by infra-red (IR), capacitive, or magnetic means, are allowed to pass-through the interface at the transmissive window to control electronic modules contained within the housing. The transmissive window may be translucent, opaque, or any degree of transparency in between to permit the transmission of signals from a control assembly external to the housing to an electronic module internal to the housing.

The present invention provides an assembly for contactless control, which may utilize various control assemblies such as infra-red (IR), capacitive, or magnetic controls. The "contactless" functionality enabled by embodiments of the present invention relates to the lack of direct contact with the electronic modules disposed within the housing. The present invention does not require a control object to pass-through the housing. That is, the control assembly is remote from, or non-contacting with, the electronic module. For example, while capacitive control may require touching the transmissive window of the present invention to complete a control circuit of the electronic module, the control circuit and the electronic module are internal to the housing while the touching occurs external to the housing. The control assembly may be any control apparatus known in the art. For example, the control assembly may be an infra-red signal transmitter, a magnetic remote controller, or a capacitive control such as a human finger.

Figure 1B:
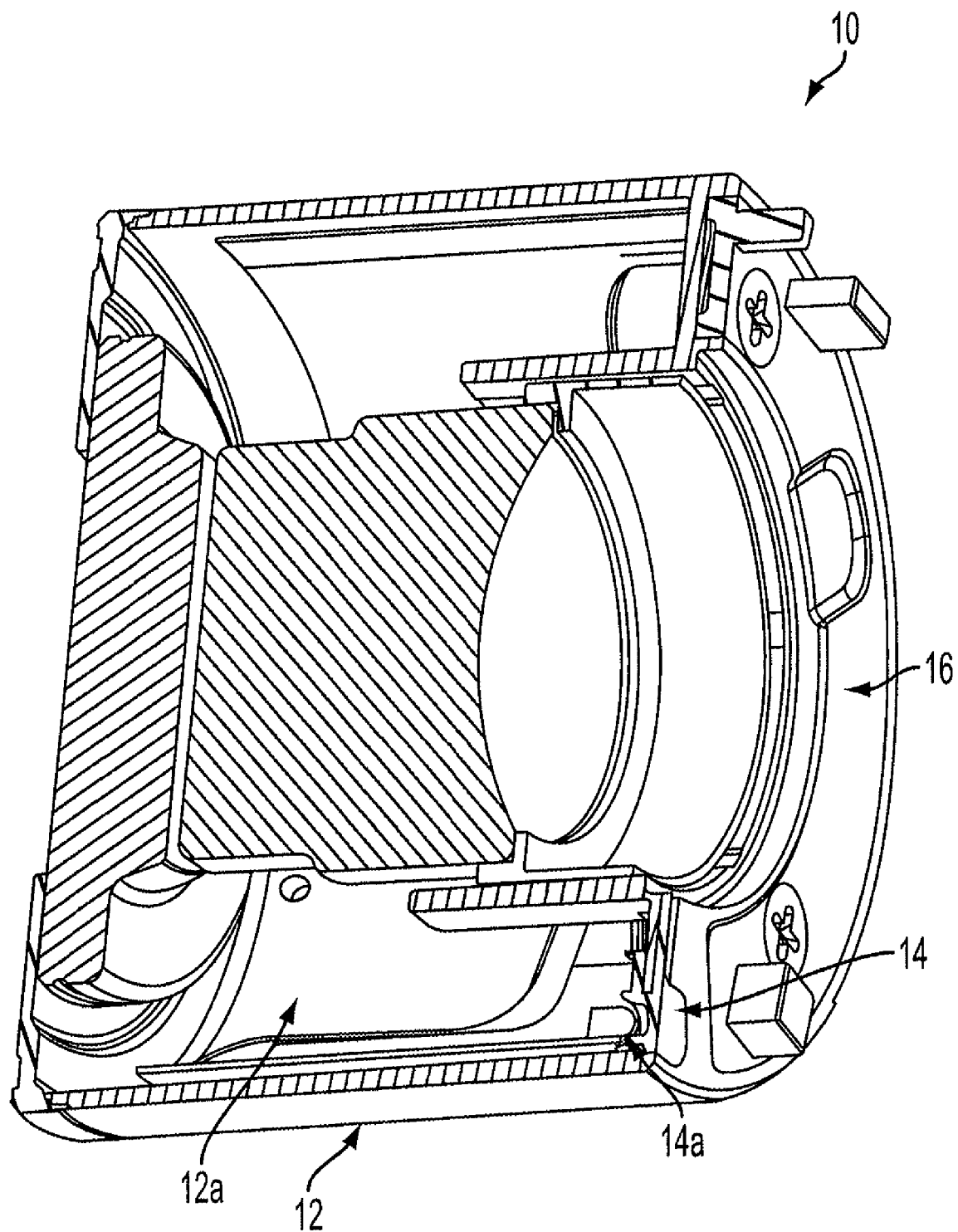
FIG. 1b is a cross-sectional perspective view of the liquid-tight programming/control interface assembly in accordance with an embodiment of the present invention.

FIG. 1a shows a perspective view of the liquid-tight programming/control interface assembly in accordance with an embodiment of the present invention, while FIG. 1b shows a cross-sectional perspective view of the same embodiment. The liquid-tight sealed assembly 10 includes a housing 12 and a transmissive window 14. The transmissive window 14 is at a control interface 16. As can be seen in FIG. 1b, a housing interior 12a is hollow to contain an electronic module. The transmissive window 14 may have a slot 14a, whereby an electronic module may be connected and retained.

Figure 3:
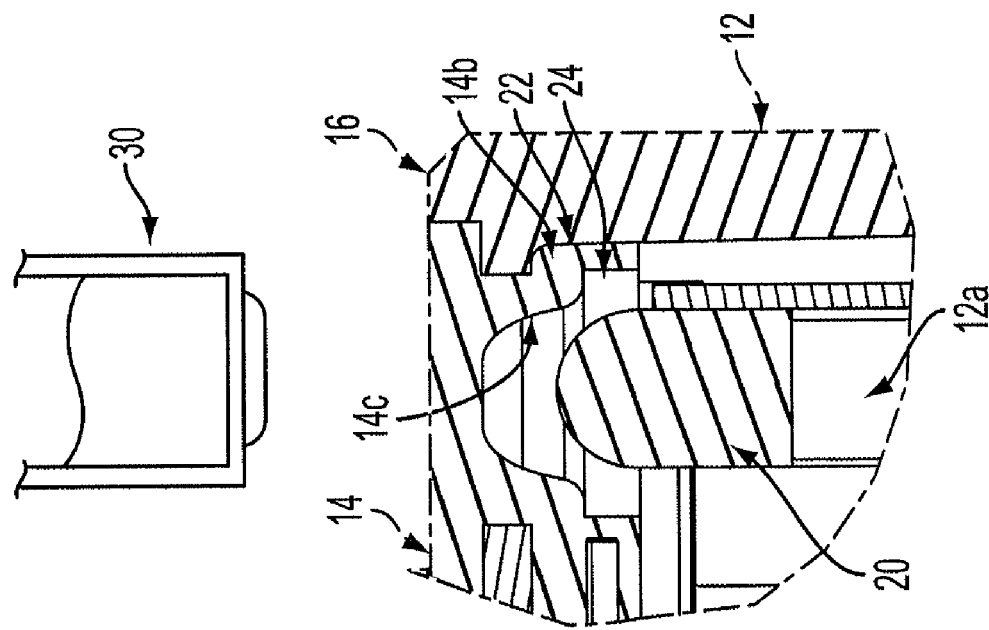
FIG. 3 shows an enlarged cross-section of the liquid-tight programming/control interface assembly in accordance with an embodiment of the present invention.
Figure 2:
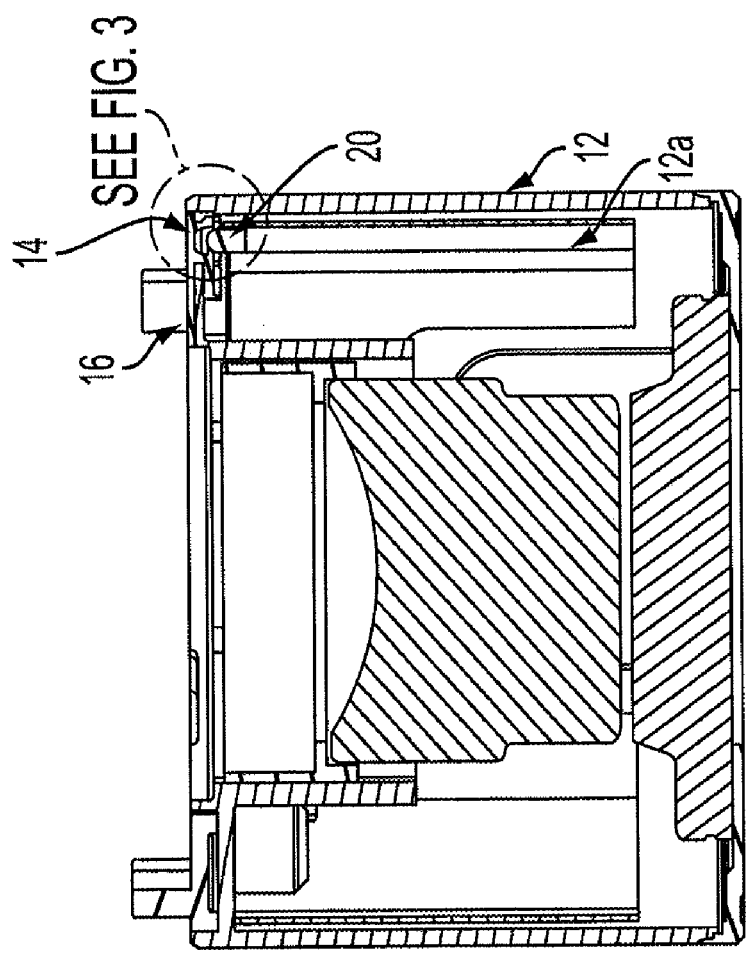
FIG. 2 shows a cross-sectional view of the liquid-tight programming/control interface assembly in accordance with an embodiment of the present invention.

FIG. 2 shows a cross-sectional view of the liquid-tight programming/control interface assembly in accordance with an embodiment of the present invention. FIG. 3 shows an enlarged cross-section of the liquid-tight programming/control interface assembly in accordance with an embodiment of the present invention. An electronic module 20 is disposed within a housing 12 at a housing interior 12a. A control assembly 30 (shown for illustrative purposes only) is disposed externally of the housing 12. A control interface 16 of housing 12 is interposed between electronic module 20 and control assembly 30. The control assembly 30 and electronic module 20 are configured to transmit and receive signals. The control interface 16 permits a transmitted signal to pass-through housing 12 while preventing environmental leakage into the housing interior 12a. Programming and control by the control assembly 30 are transmitted to electronic module 20 remotely, i.e., without direct contact between the control assembly and the electronic module. Similarly, the electronic module may transmit signals, such as set-points and system status, remotely to the control assembly.

The control interface comprises a transmissive window 14 for permitting signals to pass-through the control interface 16. The transmissive window may be translucent, opaque, or any degree of transparency in between to permit the transmission of signals from a control assembly 30 external to housing 12 to an electronic module 20 disposed in the housing interior 12a, and vice versa. Programming or control signals, such as the signals created by infra-red (IR), capacitive, or magnetic means, are allowed to pass-through the control interface 16 at the transmissive window 14.

In a further embodiment of the present invention, the transmissive window 14 is sealed to the housing 12 by over-molding 14b. A sealant 22 may be applied in addition to, or in lieu of, the over-molding 14b to seal the transmissive window 14 within the housing 12 at the control interface 16. Sealant 22 may be applied to a circumferential exterior 14c of the transmissive window 14 to provide a liquid-tight seal between the transmissive window 14 and the housing 12. The over-mold and/or sealant ensure a liquid-tight seal between the transmissive window 14 and the housing 12. In yet another embodiment, transmissive window 14 is made of a polymer resin. The housing 12 and control interface 16 may also be made of a polymer resin. The materials for the transmissive window 14 and the housing 12 may be from the same resin family and yield a tight molecular bond to prevent environmental leakage into the housing interior 12a.

The transmissive window 14 may further include a slot 14a on the side facing the housing interior 12a. Electronic module 20 disposed in the housing interior 12a may be connected to, and retained by, the transmissive window 14 at the slot 14a beneath the control interface 16 of the housing 12. An adhesive may be applied to an module interface portion 24 of the transmissive window facing the interior of the housing. The adhesive at the module interface portion 24 functions to retain the electronic module 20 once it is connected to the transmissive window 14 at the slot 14a. Optionally, potting material may be inserted within the housing interior 12a to brace the electronic module 20 and retain the electronic module 20 connected to the transmissive window 14.

Embodiments of the present invention may be used to provide a liquid-tight sealed assembly for electronic devices. The present invention is particularly suitable for electronic devices that must remain operational in critical situations and under unfavorable environmental conditions. For example, embodiments of the present invention are suitable for use in night vision imaging devices, which are employed by the military in tactical operations. Night vision imaging devices are used in a wide variety of applications to enable sight in dark environments. For example, night vision systems are utilized by military soldiers patrolling the ground at night.

The present invention may be utilized to program and control a night vision imaging device. A conventional night vision system utilizes an image intensifier ($I^2$) to amplify light from an image within a field of view of the night vision system. The image intensifier collects tiny amounts of light in a dark environment, including the lower portion of the infra-red light spectrum, that are present in the environment within the field of view but may be imperceptible to the human eye. The image intensifier amplifies the collected light from the image so that the human eye can perceive the image. Such image intensifiers are commonly employed in night vision goggles, i.e., monoculars or binoculars, that are worn on a user's head. Night vision devices are used in a variety of environmental conditions and the internal electronics, such as an image intensifier, may become damaged or inoperable if the night vision assembly is not properly sealed.

An embodiment of the present invention provides a liquid-tight sealed assembly for programming and controlling a night vision imaging device. In such a device, the electronic module may be the image intensifier. Signals may be transmitted by an external control assembly, through the transmissive window and/or control interface, to an image intensifier contained within the housing. The liquid-tight sealed assembly ensures that environmental contaminants, such as moisture, are prevented from entering the housing interior where they may effect the image intensifier and disrupt or damage the function of the night vision imaging device.

The electronic module 20 of the liquid-tight sealed assembly 10 may be an image intensifier. The image intensifier electronic module 20 located within housing 12 of the liquid-tight sealed 10 may be programmed and controlled through transmissive window 14 located at control interface 16. Transmissive window 14 may be translucent, opaque, or any degree of transparency in between to permit the transmission of signals from a signal transmitter 30 external to the housing 12 to the image intensifier electronic module 20 disposed in the housing interior 12a, and vice versa. Programming or control signals, such as the signals created by infra-red (IR), capacitive, or magnetic means, are allowed to pass-through the control interface 16 at the transmissive window 14.

The liquid-tight sealed assembly of the present invention provides: (1) enhanced security, as the electronic modules internal to the housing can not be tampered with; (2) improved reliability, because the control assembly is separated from the assembly housing and can not be broken during set-up or on-going operation; (3) increased programming and controllability, as the electronic modules can be selected and/or configured to receive signals transmitted by infra-red, capacitive, or magnetic control assemblies; and (4) improved usability in various environmental conditions, as the assembly eliminates the need for a breakthrough of the housing and the sealed control interface and/or transmissive window prevent ingress paths for environmental contaminants such as moisture.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A liquid-tight sealed assembly for a night vision device comprising
a night vision device including an image intensifier ($I^2$) tube, in which the $I^2$ tube is sealed within a housing, and
a transmissive window in the housing of the $I^2$ tube,
wherein the transmissive window permits a signal to pass-through the transmissive window for programming or controlling the $I^2$ tube within the housing.

2. The liquid-tight sealed assembly for a night vision device of claim 1, wherein the transmissive window is sealed to the housing.

3. The liquid-tight sealed assembly for a night vision device of claim 2, wherein the transmissive window is over-molded to seal the housing.

4. The liquid-tight sealed assembly for a night vision device of claim 2, wherein the transmissive window is sealed to the housing by a sealant.

5. The liquid-tight sealed assembly for a night vision device of claim 1, wherein the transmissive window is over-molded and the window is sealed to the housing by a sealant.

6. The liquid-tight sealed assembly for a night vision device of claim 1, wherein the transmissive window is translucent.

7. The liquid-tight sealed assembly for a night vision device of claim 1, wherein the transmissive window is opaque to visible light.

8. The liquid-tight sealed assembly for a night vision device of claim 1, wherein the transmissive window is made of a polymer resin.

9. The liquid-tight sealed assembly for a night vision device of claim 1, wherein the housing is made of a polymer resin.

10. The liquid-tight sealed assembly for a night vision device of claim 1, wherein the signal is an infra-red, a capacitive, or a magnetic signal.

11. A night vision imaging sensor assembly comprising
a night vision device including an image intensifier ($I^2$) tube, in which the $I^2$ tube is sealed within a housing,
an electronic module disposed within the housing of the $I^2$ tube,
a control assembly disposed externally of the housing, and
a control interface of the housing interposed between the electronic module and the control assembly;
wherein the control assembly is configured to transmit signals,
the electronic module is configured to receive the signals, and the control interface permits a signal transmitted by the control assembly to pass-through the housing of the $I^2$ tube while preventing environmental leakage into the housing.

12. The night vision imaging sensor assembly of claim 11, wherein the control interface comprises a transmissive window for permitting signals to pass-through the interface.

13. The night vision imaging sensor assembly of claim 12, wherein the transmissive window is sealed to the housing by over-molding or by a sealant.

14. The night vision imaging sensor assembly of claim 11, wherein the control interface comprises a transmissive window that is over-molded and sealed to the housing by a sealant.

15. The night vision imaging sensor assembly of claim 11, wherein the signals are infra-red, capacitive, or magnetic signals.

16. The night vision imaging sensor assembly of claim 11, wherein
the control interface comprises a transmissive window for permitting signals to pass-through the interface, the transmissive window being made of a polymer resin; and
the housing being made of a polymer resin;
wherein the materials for the transmissive window and the housing are from the same resin family and yield a tight molecular bond to prevent environmental leakage into the housing.

17. A liquid-tight sealed sensor assembly comprising
a night vision device including an image intensifier ($I^2$) tube, in which the $I^2$ tube is sealed within a housing;
a control assembly disposed externally of the housing, the control assembly configured to transmit and receive signals;
an electronic module disposed within the housing, the electronic module configured to receive and transmit signals; and
a transmissive window of the housing interposed between the electronic module and the control assembly, wherein the transmissive window permits the signals to pass-through the housing and control the $I^2$ tube.

18. The liquid-tight sealed sensor assembly of claim 17, wherein the transmissive window is sealed to the housing by over-molding or by a sealant.

19. The liquid-tight sealed sensor assembly of claim 17, wherein the control interface comprises a transmissive window that is over-molded and sealed to the housing by a sealant.

20. The liquid-tight sealed sensor assembly of claim 17, wherein the signals are infra-red, capacitive, or magnetic signals.

* * * * *